United States Patent
Svoboda

[11] Patent Number: 5,674,541
[45] Date of Patent: Oct. 7, 1997

[54] MOLD CLOSING UNIT

[76] Inventor: Bruno Svoboda, Burggasse 128, 1070 Vienna, Austria

[21] Appl. No.: 532,713
[22] PCT Filed: Apr. 7, 1994
[86] PCT No.: PCT/AT94/00042
§ 371 Date: Sep. 28, 1995
§ 102(e) Date: Sep. 28, 1995
[87] PCT Pub. No.: WO94/22654
PCT Pub. Date: Oct. 13, 1994

[30] Foreign Application Priority Data

Apr. 7, 1993 [AT] Austria .................. 707/93

[51] Int. Cl.$^6$ .................. B29C 45/67
[52] U.S. Cl. .................. 425/190; 425/589; 425/590; 425/450.1
[58] Field of Search .................. 425/589, 590, 425/595, 450.1, 451.2, 451.9, 190

[56] References Cited

U.S. PATENT DOCUMENTS

| | | | |
|---|---|---|---|
| 3,663,140 | 5/1972 | Hehl | 425/590 |
| 4,105,385 | 8/1978 | Hehl | 425/590 |
| 4,111,629 | 9/1978 | Nussbaumer | 425/590 |
| 4,128,380 | 12/1978 | Jamann | 425/450.1 |
| 4,249,880 | 2/1981 | Wohlrab | 425/590 |
| 5,336,462 | 8/1994 | Wohlrab | 425/590 |
| 5,422,060 | 6/1995 | Nakamura | 425/590 |

FOREIGN PATENT DOCUMENTS

| | | |
|---|---|---|
| 0 011 838 | 6/1980 | European Pat. Off. |
| 2 589 390 | 5/1987 | France . |
| 2 681 268 | 3/1993 | France . |
| 22 33 222 | 1/1973 | Germany . |
| 22 53 451 | 5/1973 | Germany . |
| 25 44 105 | 4/1977 | Germany . |
| 1 541 160 | 2/1979 | United Kingdom . |

*Primary Examiner*—James P. Mackey
*Attorney, Agent, or Firm*—Wolfgang Stutius; Henry M. Feiereisen

[57] ABSTRACT

A mold closing unit for an injection molding device includes a machine frame, a moving mold platen and a fixed mold platen joined by four guide rods at the corners of the plates, with the moving mold platen being moveable along the guide rods via hydraulic cylinders connected thereto and arranged in prolongation of the rod axes, and with the diameters of one pair of piston rods being smaller and with the diameters of another pair of piston rods being greater than the diameter of the identical guide rods so that the contact surfaces of the pistons of each hydraulic cylinder on the opening and the closing sides are of different sizes.

10 Claims, 6 Drawing Sheets

MOLD CLOSING UNIT

BACKGROUND OF THE INVENTION

The invention relates to a mold closing unit for an injection molding apparatus, having a moving mold platen and a fixed mold platen that are connected by four guide rods positioned at the platen corners, with the symmetric platen being attached to hydraulic cylinders in prolongation of the rod axes and moveable along the guide rods.

The objective of such a mold closing unit is, on the one hand, to allow a displacement of a moving mold platen toward and away from a fixed mold platen at a high velocity, and, on the other hand, to effect at already closed mold a high clamping pressure that compensates the counterforce generated by the injected compound and prevents an opening of the mold and therefore an escape of the molding compound from the mold.

A number of proposals are known to meet these objectives.

Typically, between two fixed plates, that are connected together by four rods, a slideably supported plate is moved by a drive mechanism along these rods.

In general, this mechanism includes one or several hydraulic cylinders for effecting the high-speed traverse, and one or more pressure pad cylinders for generating the clamping force.

Furthermore, distinction is being made between direct clamping machines, in which the pressure pad cylinders are supported by an aspirated oil column, and hydromechanical machines that effect the support by means of a mechanical clamping action.

Systems are also known which use a toggle lever device for displacement of the plate.

In general, such a toggle lever device is driven via a centrally acting hydraulic cylinder. However, the second fixed platen used in this configuration must be movable in order to permit adjustment of the respective zero point during a tool change (for varying workpiece heights). This is especially required as the toggle lever device allows only a maximum position. The displacement of this platen is generally effected by a gear motor and a planet wheel, thereby further complicating the structure.

It is known from the above-mentioned configurations to operate the closing unit by a centrally acting piston cylinder which during displacement of the mold platen replaces its oil volume via a tank positioned directly below the unit. A second cylinder, which may also be arranged within the piston cylinder, effects a rapid motion of the unit, with oil being aspirated via the second cylinder, and with a pump building up pressure for generating the clamping force after closing the piston space.

Further, a mold closing unit is known in which the clamping force is generated by rods serving simultaneously as piston rods This unit uses a symmetrical 4-point force introduction, with oil being displaced through separate high-speed cylinders from one piston side to the other. Oil is thereby moved through external oil conduits that are arranged about the unit, with the rods being secured on a plate-shaped stand. The use of the high-speed cylinder again reduces the space required for ejection.

SUMMARY OF THE INVENTION

It is an object of the invention to provide a mold closing unit of the afore-mentioned type, obviating the drawbacks of the prior art.

It is thus an object of the invention to provide a mold closing unit of simple configuration without a support plate, of shorter structure, smaller weight, better accessibility and therefore creation of more space for the ejection unit.

It is a further object of the invention to provide a rapidly reacting motion cycle of the mold closing unit without particular additional measures, especially without high-speed cylinders as well as to provide a higher mold opening force.

It is also an object of the invention to avoid a feeder tank and to enable a simple and quick withdrawal of the rods for installation of bulky molds.

These objects are attained in accordance with the invention by providing two piston rods of a diameter which is smaller and two piston rods of a diameter which is greater than the diameters of the identical rods so that the contact surfaces of the pistons of each hydraulic cylinder on the opening and closing sides are of different sizes.

Through this configuration, the hydraulic cylinder assumes the function of a differential cylinder. When both contact surfaces are thus acted upon, always the greater surface will dominate. The amount of oil being conveyed corresponds to the differential cross sectional area of the utilized piston rods, with the oil pressure being equal on both sides of the piston. Therefore, the direction of displacement of the piston is set.

In accordance with a further feature of the invention, diagonally opposing piston rods have identical diameters.

The diagonal arrangement of the piston rods of same diameter affords upon respective use of one of these pairs a simple solution for closing and opening of the mold closing unit with symmetrical force introduction. Since the contact surfaces on the rod side are always identical for each pair of piston rods, one pair is thus simply used to open the unit while the other one is used to close the unit.

According to a further development of the invention, annular spaces are provided adjacent the respective contact surfaces of each piston, with one annular space extending about the piston rod on the opening side and one annular space extending about the rod on the closing side for receiving the hydraulic fluid.

As the annular spaces are subject to the same pressure, but have different contact surfaces, the piston is moved in the direction of the smaller surface.

According to a further advantageous feature of the invention, the piston rod of each piston is provided with an oblong bore for circulation of hydraulic fluid between the annular spaces.

Thus, the hydraulic fluid circulates advantageously inside, whereby the fluid is displaced over inner conduits during shifting of the cylinder.

The invention is further advantageously characterized by positioning in each oblong bore a control pipe driven by a control cylinder for controlling the circulation, with each control pipe being provided with a control pipe bore for receiving and conducting hydraulic fluid.

The clamping pressure is effected via the control pipe bore, with the control pipe closing the piston rod bore in order to close the connection during build up of pressure and thus to operate like a valve. According to a further feature of the invention, a valve seat for the control pipe is arranged in the area of the piston rod bore adjoining the overflow zone for the hydraulic fluid.

An embodiment of the invention is also characterized by the connection of the hydraulic cylinders in the area of the contact surfaces of each piston with a respective supply conduit for hydraulic fluid.

It is further provided to connect the piston rod bore with a conduit for hydraulic fluid.

According to a further feature of the invention, the moving mold platen is secured on the machine frame by a longitudinal guide.

Therefore it is no longer required to align the mold platen necessarily parallel to the column.

Advantageously, the unit is actuated through operation of only two respective diagonally opposing hydraulic cylinders.

According to a further feature of the invention, which is particularly relevant when inserting and extracting larger molds, at least one guide rod is releasably secured in the fixed mold platen, preferably by a quick release lock.

Thus, it is no longer necessary to loosen a nut on the backside of the plate during withdrawal of the rod, thereby making the task decidedly less cumbersome.

Advantageously, a closing cylinder is of double-acting configuration, and the guide rod assigned to this cylinder is being retracted from or pushed into the fixed platen by the cylinder.

According to a further feature of the invention, the closing cylinder assigned to the removable guide rod, the control pipe and the piston rod may be extended in relation to the corresponding elements associated to the further guide rods.

A further advantageous variation is characterized by a separate control of the closing cylinder effecting a movement of the guide rod.

BRIEF DESCRIPTION OF THE DRAWING

An exemplified embodiment of the invention will now be described in more detail with reference to the accompanying drawing, in which.

DETAILED DESCRIPTION OF THE PREFERRED EMBODIMENTS

Figure 1:
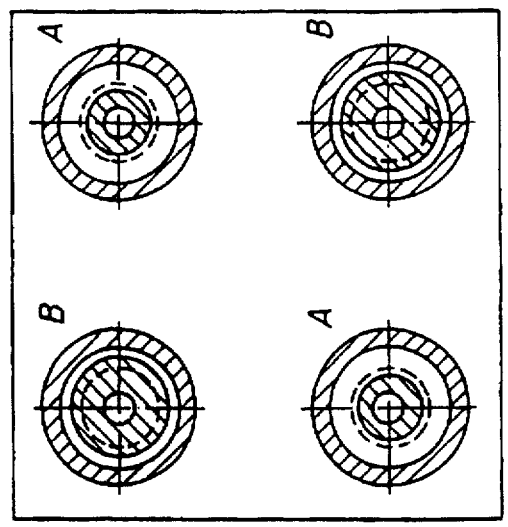
FIG. 1 shows a sectional view through the mold closing unit of FIG. 1A taken along the line I—I.
Figure 1A:
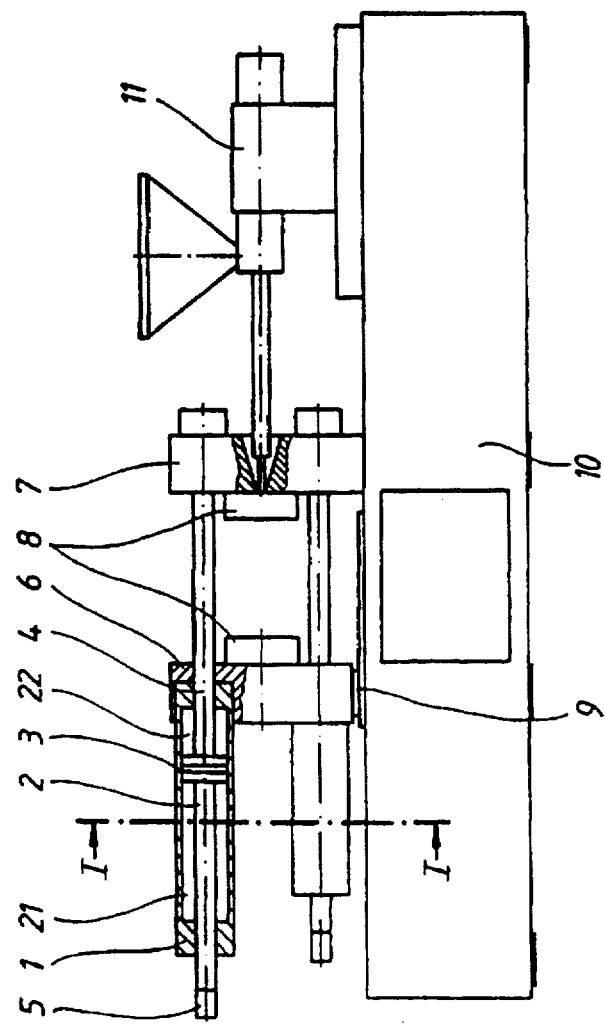
FIG. 1A shows an injection molding device with a mold closing unit according to the invention.

FIG. 1A shows a typical configuration of an injection molding machine.

A closing piston 3 that is actuated by a piston rod 2 is disposed in the closing cylinder 1. Also projecting into the closing cylinder 1 is the guide rod 4 connected adjacent the piston. The piston rod 2 is controlled by a control cylinder 5. The moving mold platen 6 is shifted along the guide rods 4 that are arranged in the corner areas of the fixed mold platen 6. The guide rods 4 themselves are secured to the fixed mold platen 7 that is mounted to the machine frame 10.

The moving and the fixed mold platens 6,7 support mold halves 8 which receive a molding compound injected by an injection molding assembly 11 when the mold closing unit is in closed position, whereby the generated mold opening force must be smaller than the mold clamping force of the closing unit.

Section I—I shows the symmetric arrangement of the hydraulic cylinders, with diagonally opposing cylinders A, B representing effective pairs during closing and opening and being provided with identical piston rod diameters. Hence, the contact surfaces of the pistons of each pair A, B at the side of the piston rod are of equal size.

The working cycle begins with the closing of the mold. The moving mold platen 6 that is driven by the closing cylinders 1 and supported on guide 9 moves rapidly toward the fixed mold platen 7, with the mold closing operation being executed by the diagonally opposing hydraulic cylinders B. When closing the mold, the closing pressure for generating the mold clamping force is built up through supply of compressed oil in the annular space 22 on the closing side.

Figure 2:
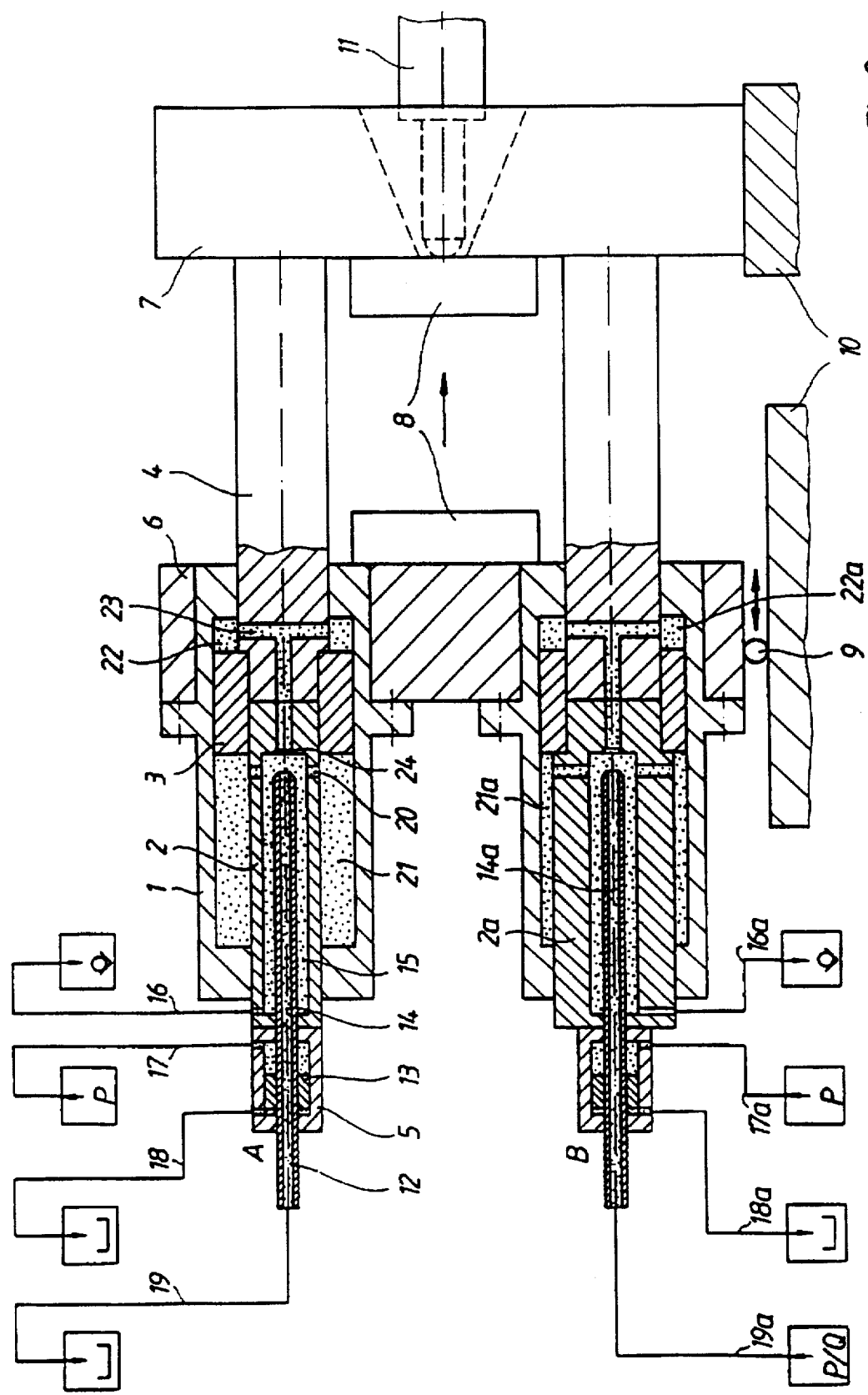
FIG. 2 shows the mold closing unit according to the invention in closing position.

As shown in FIG. 2, each piston rod is equipped with a piston rod bore 15. Provided in each piston rod bore is a control pipe 12 which in turn is provided with a control pipe bore to maintain an open connection to the annular space 22 at the closing side. By means of the control pipe 12, a connection to the opening side annular space 21 can be maintained open or closed depending on its position.

The control pipe is driven by a control piston 13, fixedly secured thereto.

The control pipe bore 14, the control piston 13 as well as the piston rod bore 15 are connected with conduits 16, 17, 18, 19, 16a, 17a, 18a, 19a that conduct hydraulic fluid and depending on the task being fulfilled serve as supply or discharge of fluid, or are even shut-off.

Upon closing of the mold according to FIG. 2, the control pipes of all four closing cylinders remain in the position "open" and are retained in this position by compressed oil acting upon the control piston 13 via the conduits 17 (17a).

The control pipe bores 14 of both closing cylinders A are connected with the tank (illustrated symbolically) via the connecting conduits 19.

The control pipes bores 14a of both closing cylinders B are connected via the connecting conduits 19a with the pressure generator which supplies hydraulic fluid into the system. The differently sized annular surfaces of the annular spaces 21a and 22a produce an effective annular area which corresponds to the difference surface area between these two annular spaces 21a and 22a and effect upon admission of compressed oil through the control pipe bore 14a a displacement of the moving mold platen 6 in direction toward the fixed mold platen 7 and therefore a closing of the mold.

The oil volume of the annular spaces 21 of both closing cylinders A is forced via the overflow channels 20 and 23 into the annular space on the closing side 22, with the volume differential flowing back to the oil tank via the control pipe bores 14 and the connecting conduits 19.

After closing the mold, it is necessary to generate an increased pressure in order to be able to commence the injection of the molding compound into the mold.

Figure 3:
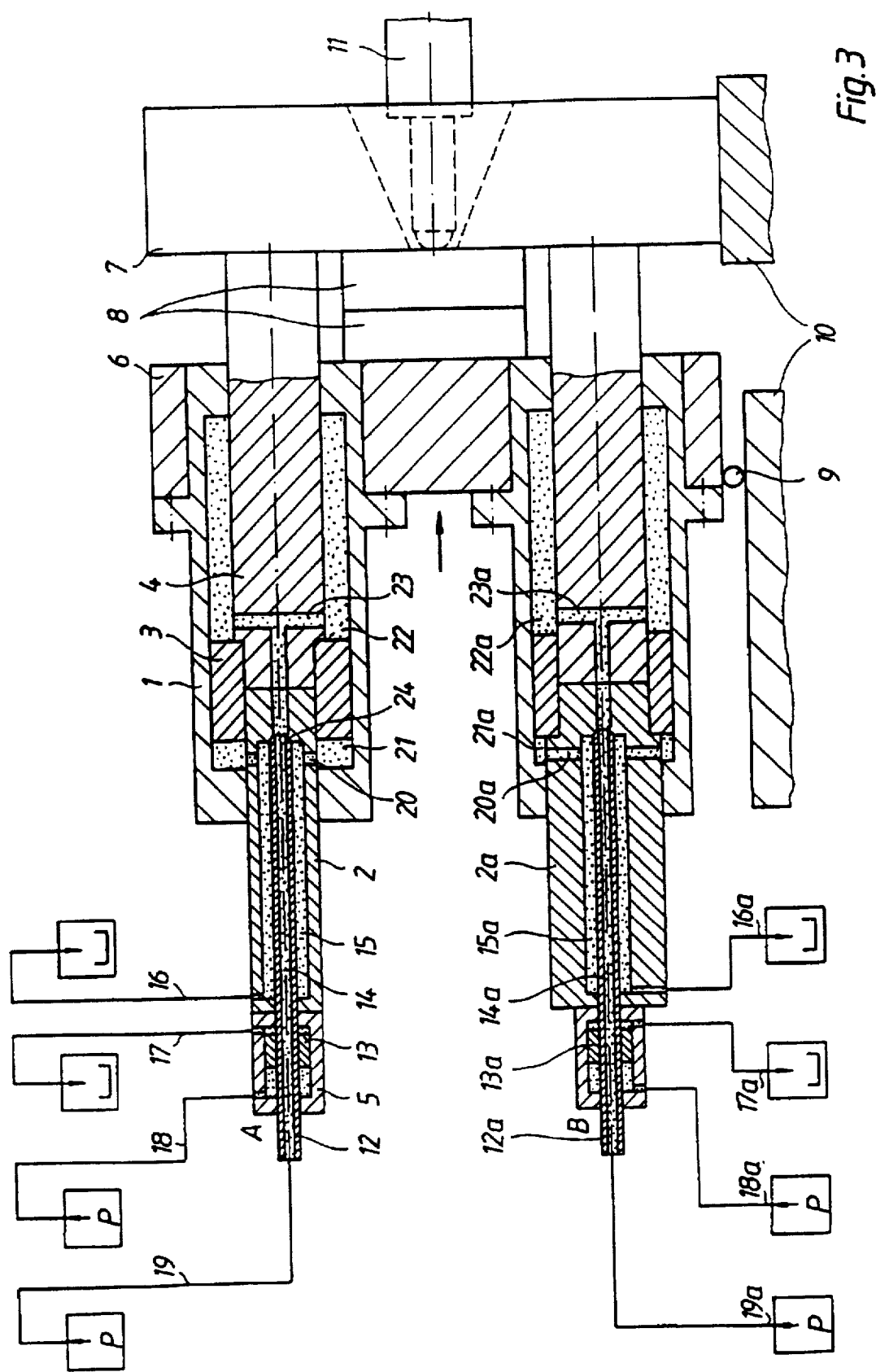
FIG. 3 shows the mold closing unit according to the invention in a closed position.

This step is illustrated in FIG. 3.

The control pipes 12, 12a of all four closing cylinders are shifted by the respective control pistons 13, 13a in longitudinal direction toward the closing piston 3 until the control pipe rests on the valve seat 24 with an aligned cone on one end and thus cuts the connection between the annular spaces 21, 22 and 21a, 22a. The operation of the control pistons 13, 13a is effected via the conduits 18, 18a.

The annular surfaces 21, 21a on the opening side are pressure-relieved via the conduits 16, 16a, the piston rod bores 15, 15a and the connection channel 20, 20a. At the same time, compressed oil is admitted to the control pipe bores 14, 14a via the connecting conduits 19, 19a and to the annular spaces 22, 22a on the closing side via the overflow channels 23, 23a, to thereby generate the clamping force.

Figure 4:
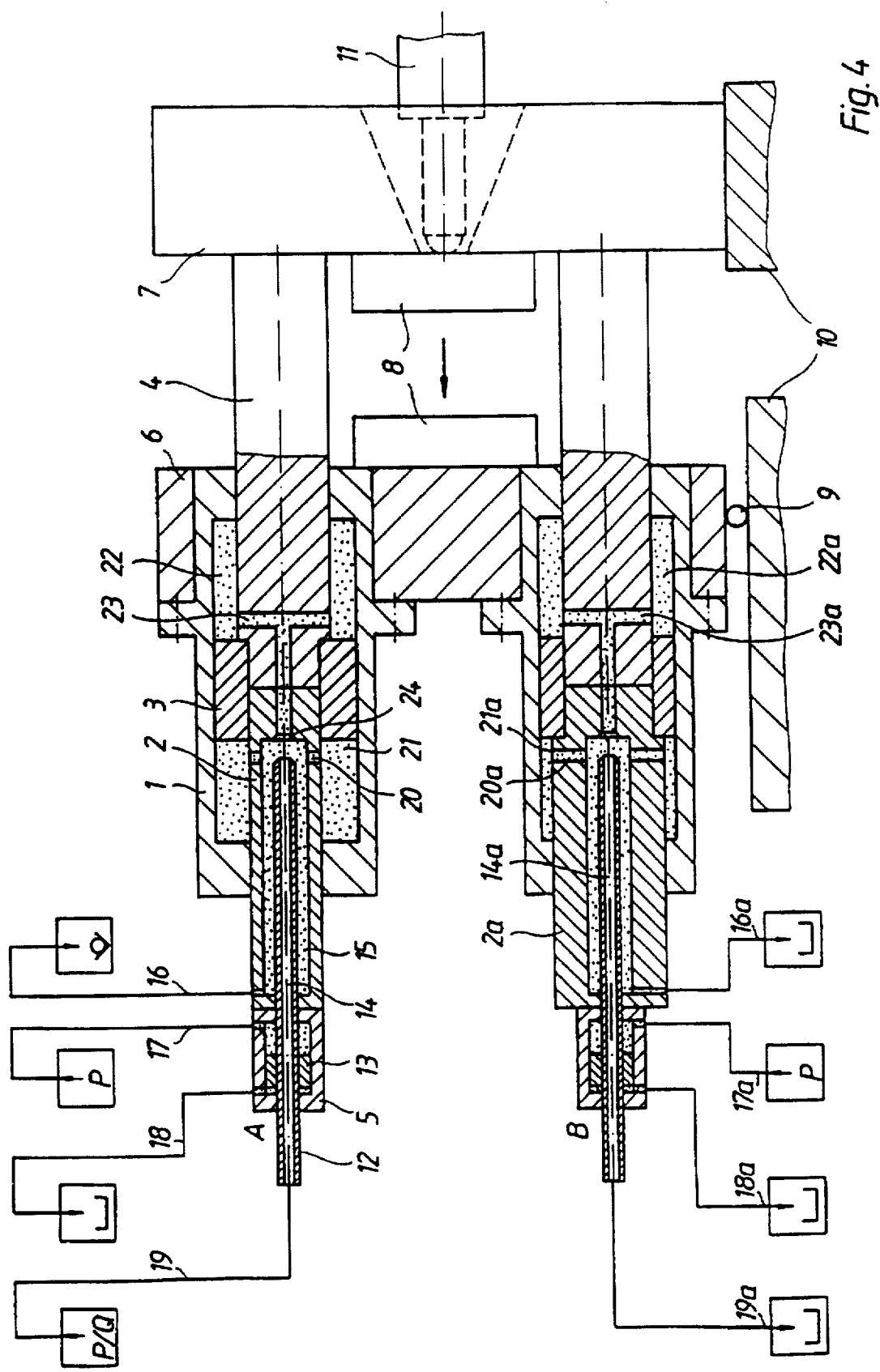
FIG. 4 shows the mold closing unit according to the invention in open position.

After effected injection of the molding compound, the mold closing unit is opened according to FIG. 4.

This displacement is executed by the two diagonally opposing hydraulic cylinders A. The control pipe bores 14a of both closing cylinders B communicate via the connection conduit 19a with the tank, whereas the control pipe bores 14 are connected with the pressure generator via the conduit 19. The control pipes 12, 12a are set in open position by control cylinders 13, 13a actuated via the conduits 17, 17a. The differently sized annular surfaces of the annular spaces 21 and 22 result in an effective annular area in correspondence to the difference in surface area between two annular spaces 21 and 22 to thereby cause upon admission of compressed oil through the control pipe core 14 a displacement of the moving mold platen away from the fixed mold platen 7 and thus an opening of the mold halves 8. The oil volume of the annular spaces 22a of both closing cylinders B flows via the overflow channels 20a, 23a into the annular space 21a, and the difference in volume flows via the control pipe bore 14a into the oil tank.

In the event, the workpiece sticks to the mold or is formed with undercuts, an increased opening force is needed, at least temporarily, during the opening operation.

Figure 5:
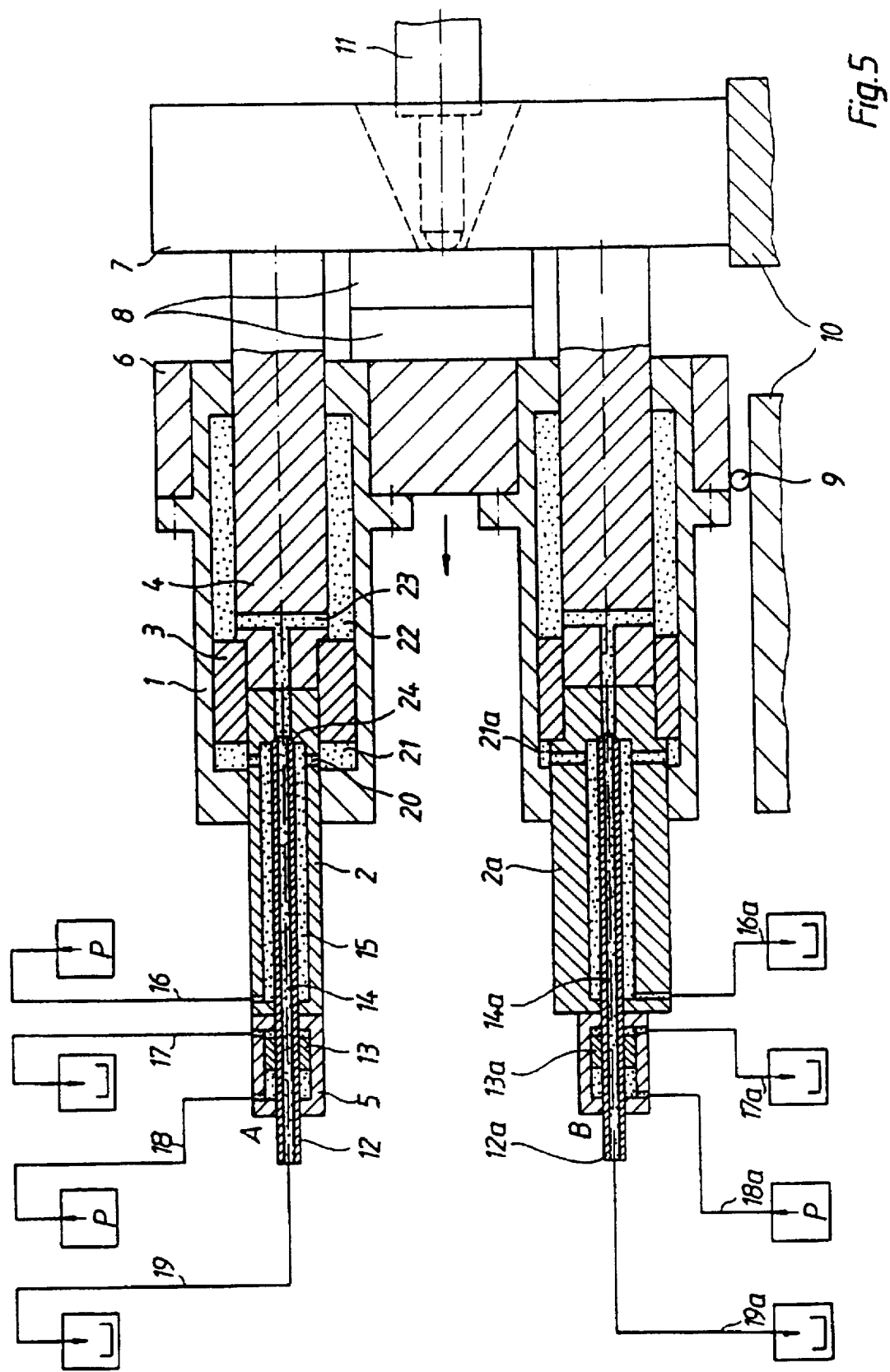
FIG. 5 shows the mold closing unit according to the invention in a closed position at increased opening force.

The respective connection arrangement is illustrated in FIG. 5.

The control pipes 12, 12a are pushed forwards by the control pistons 13, 13a, and the valves 24 are closed. Then, the piston rod bore 15 of the closing cylinders A is connected with the pressure generator, and the annular space 21 is pressurized. Approximately 50% of the clamping force is generated thereby. This increased opening force is needed for separating the mold halves 8 by only few "mm", then a switch to the connection arrangement shown in FIG. 4 for opening the mold can be effected again and the valves 24 can be opened.

In order to extract bulky pieces from the mold closing unit, the front upper rod is generally removed.

Figure 6:
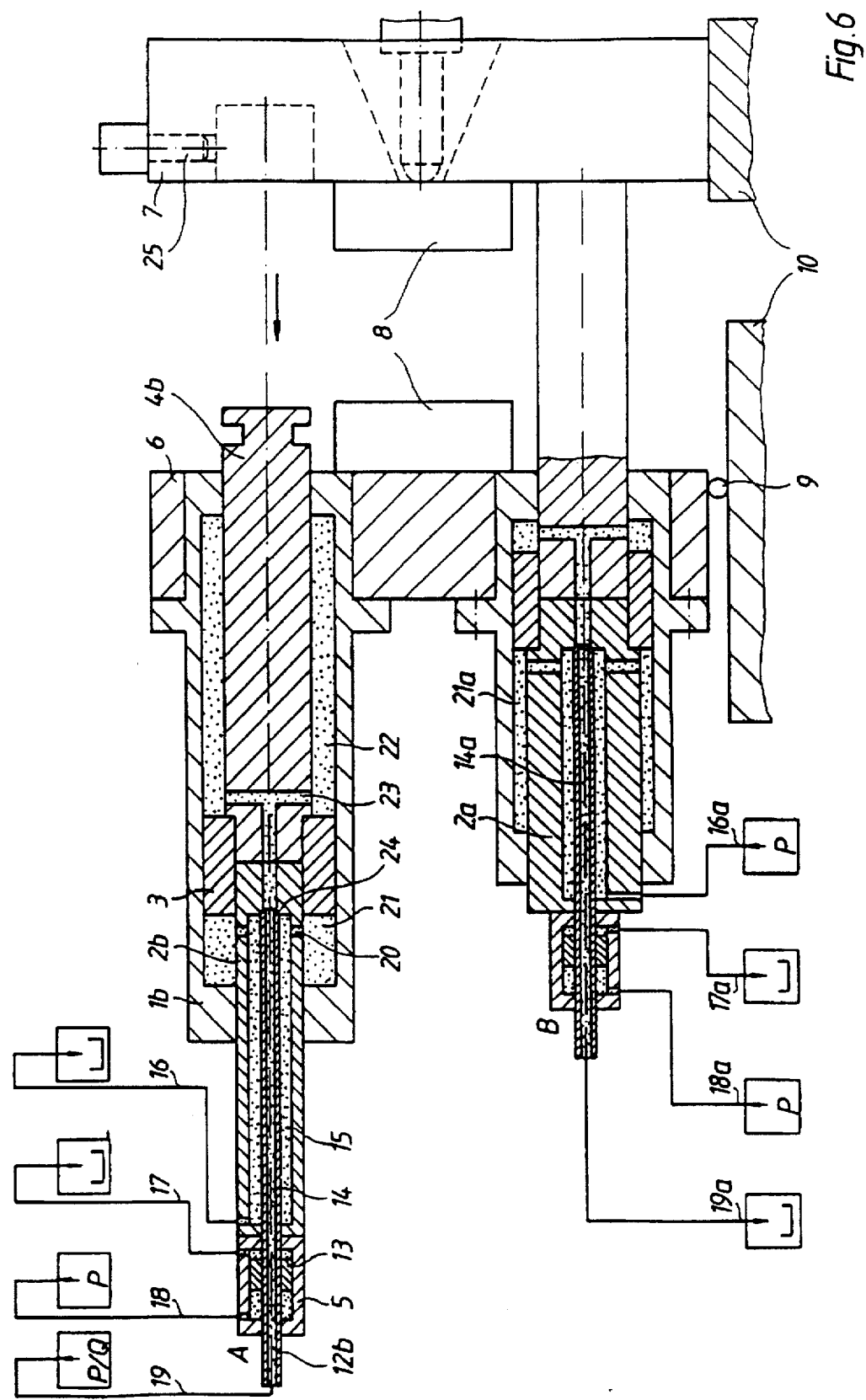
FIG. 6 shows the mold closing unit according to the invention with pulled rod.

The connection arrangement to retract the rod is illustrated in FIG. 6.

The control of the closing cylinders B corresponds thereby to the one for generating the increased opening force for the closing cylinder A.

The control pipe 12b is connected via the conduit 19 with the pressure generator. The valve 24 is closed. The pressure fluid flows via the overflow channel 23 into the annular space 22. Therefore, the closing side buildup of pressure in the selected cylinder causes a movement of the guide rod 4b away from the fixed mold platen 7 in opposition to the force exerted by the three remaining closing cylinders.

In order to be able to remove the guide rod 4b to be removed also from the fixed platen 7, a closing mechanism is provided, with the end of the guide rod 4b being provided with a groove for engagement of a locking member 25 in form-fitting fashion.

I claim:
1. A mold closing unit for an injection molding device of a type having a machine frame, a moving mold platen and a fixed mold platen secured to the machine frame, said mold closing unit comprising:

a.) connecting means in form of circumferentially spaced guide rods for securing the moving mold platen to the fixed mold platen, said guide rods arranged in diagonally opposed pairs and defining a diameter;

b.) piston-cylinder units received in the moving mold platen in prolongation of the guide rods, each said piston-cylinder unit including a cylinder and a piston received in the cylinder for subdividing the cylinder in a closing-side annular space and an opening-side annular space and being formed with a piston rod interacting with the associated guide rod and exhibiting a bore, said piston rods defining a diameter wherein the diameter of a first pair of diagonally opposed piston rods is greater than the diameter of the guide rods and the diameter of a second pair of diagonally opposed piston rods is smaller than the diameter of the guide rods; and c.) pressure control means disposed in each of the piston-cylinder units for regulating a pressure in the opening-side and closing-side annular spaces, said pressure control means including a control pipe guided in the bore of the piston rod for displacement in an axial direction and having a control pipe bore, and fluid passageways for connecting the bore of the piston rod and the control pipe bore with the opening-side and closing-side annular spaces;

whereby the movement of the moving mold platen is controlled in response to the pressure applied to the control pipe bores.

2. The mold closing unit defined in claim 1, wherein the fluid passageways include first overflow channels for connecting the bore of the piston rod with the opening-side annular space and second overflow channels for connecting the bore of the piston rod with the closing-side annular space.

3. The mold closing unit defined in claim 2, wherein the piston rod defines a valve seat associated with the second overflow channels, said control pipe cooperating with the valve seat for directing a fluid flow from the control pipe bore to the opening-side and closing-side annular spaces.

4. The mold closing unit defined in claim 1, further comprising:
drive means for operating the control pipe, said drive means including a control cylinder and a control piston received in the control cylinder and directly connected to the control pipe.

5. The mold closing unit defined in claim 1, wherein at least one of the guide rods is releasably secured to the fixed mold platen.

6. The mold closing unit defined in claim 5, wherein the at least one guide rod is releasably secured to the fixed mold platen via a quick-release.

7. The mold closing unit defined in claim 5, wherein the at least one guide rod is longitudinally moving by applying pressure to the closing-side annular space via the control pipe bore after release of the guide rod from the fixed mold platen.

8. The mold closing unit defined in claim 7, wherein the closing cylinder, the control pipe and the piston rod associated with the at least one guide rod are longitudinally extended outwardly and longer than the closing cylinders of the guide rods fixedly attached to the fixed mold platen.

9. The mold closing unit defined in claim 8, wherein the closing cylinder for moving the at least one guide rod is separately controlled by hydraulic pressure.

10. The mold closing unit defined in claim 1, further comprising
guide means for supporting the moving mold platen on the machine frame for displacement in a longitudinal direction.

* * * * *